Dec. 25, 1951      L. J. BENOIT      2,580,343

VALVE GUARD

Filed May 21, 1949

*INVENTOR.*
LEON J. BENOIT

BY *[signature]*

ATTORNEY

Patented Dec. 25, 1951

2,580,343

UNITED STATES PATENT OFFICE 2,580,343

VALVE GUARD

Leon J. Benoit, Benson, Minn.

Application May 21, 1949, Serial No. 94,635

5 Claims. (Cl. 152—427)

My invention relates to an improvement in a valve guard protector particularly for long rubber covered air-water tractor valves.

It is an object of my invention to provide a valve guard used to protect a valve of a tractor tire which protrudes from the rim of the wheel of a tractor. It is also an object of my invention to provide a valve guard protector which is simply constructed and which will efficiently ward off corn stalks, frozen dirt, brush, wire and rocks from the valve, allowing them to pass over and around the valve without injury to the valve as the tractor or vehicle is operated. My valve guard also prevents animals from chewing the valve.

It is a further object of my invention to provide a valve guard which will fit different sizes and types of wheel rims and which is adjustable as to different length valves. It is an additional object of my invention to provide a valve guard which may be made from a died-out flat piece of metal or any suitable material formed to shape.

These features, together with other details and objects, will be more clearly defined in the following specification and claims:

Figure 1:
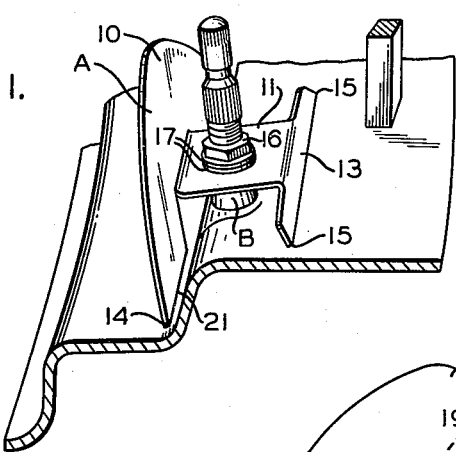
Figure 1 is a perspective view of my valve guard secured in position on a valve protruding from the rim of a wheel, a portion of the rim and a spoke being illustrated.

My valve guard A is composed of the front flat guard wall portion 10 which has formed and extending at a right angle therefrom the table portion 11 in which is formed the hole 12 adapted to receive the valve stem B. The rear longitudinal support member 13 depends from and is formed at a right angle to the table portion 11. The outward corners 14 of the front wall portion 10 and the outward corners 15 of the rear support member 13 rest on the rim of a wheel when the valve B is secured within the hole 12 by means of the nut 16. The washers 17 are placed beneath the nut 16 and upon the table portion 11 to provide for adjustment where the length of the valve stem B may vary.

Figure 2:
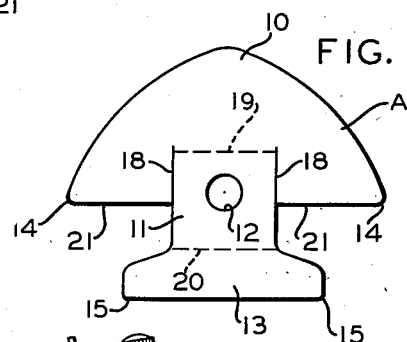
Figure 2 is a view of my guard in died-out blank form.

My valve guard A is died-out from a single sheet of material by laying out the same as illustrated in Figure 2 with the cuts 18 formed in the front of the wall portion 10. The table portion 11 is constructed by folding or bending on the dotted line 19 so that the table portion 11 is at right angles to the front wall portion 10. The support member 13 is formed by folding or bending on the dotted line 20 so that the support portion 13 depends at right angles to the table portion 11. As illustrated in the drawings, my valve guard is shaped in the form of an h when completed.

Figure 3:
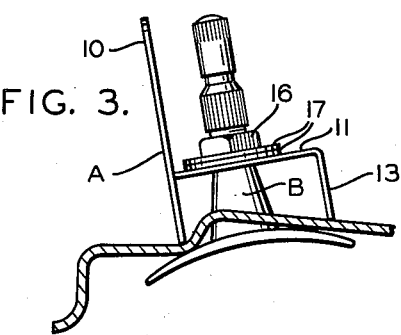
Figure 3 is an end view of my valve guard secured to a wheel rim, a portion of the rim being shown in section.
Figure 4:
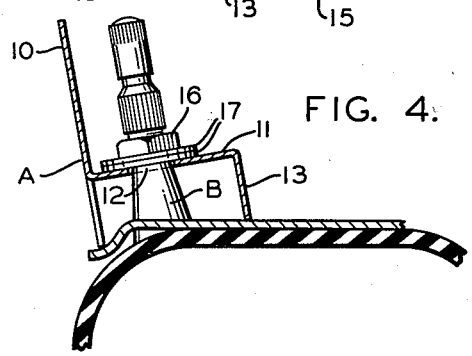
Figure 4 is a view similar to that shown in Figure 3 illustrating my guard mounted on a different style wheel rim with the rim and guard shown in section.
Figure 5:
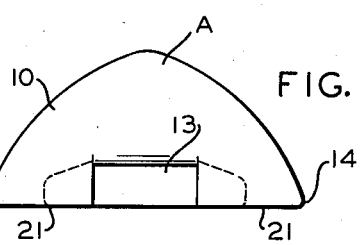
Figure 5 is a front view of my device.
Figure 6:
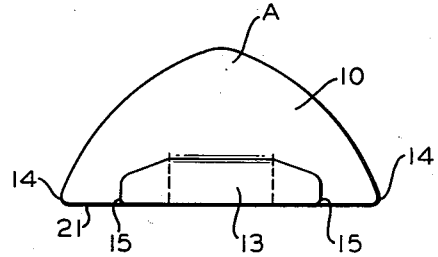
Figure 6 is a rear view thereof.
Figure 7:
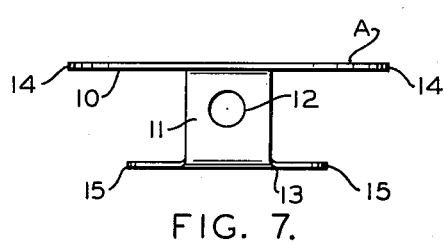
Figure 7 is a plan view of the same.

With my valve guard in position the extreme top portion of the guard wall 10 is slightly higher than the tip of the valve B. The width of the rim upon which my valve guard is placed is immaterial. My valve guard A will fit different style rims as illustrated in Figures 1, 3, and 4.

My guard A is positioned and secured on the tire valve B of the wheel and rim in the following manner: The standard valve nut 16 is removed from the valve and the guard A is positioned on the rim so that the wall 10 is positioned toward the outside of the rim of the wheel with the lower edge 21 of the wall portion 10 toward the rim, the wall portion 10 resting on the outward corners 14 thereof, and the valve B extending upwardly through the hole 12. As a result, the inner support member 13 rests on the wheel rim on the points 15 thereof. The nut 16 is then screwed down upon the valve and when necessary the washers 17 are placed thereunder for proper use of the threads on the valve. Thus, I have provided a simple valve guard for air-water tractor tire valves which may be simply and economically produced. In using my valve protector its utility will be apparent. In providing the support portion 13 and the lower portion of the guard wall plate 10 together with the table or bridge connection 11 my device has the space between the portion 13 and the lower portion of the plate 10 and beneath the table portion 11 so that my guard may be placed on the rounded edge of a rim, the rounded portion of the rim projecting into the space beneath the table portion 11. It is apparent that my valve guard A may also be placed on the flat surface of a rim where the valve protrudes from a flat surface. It is also apparent that the arcuated guard plate 10 tends to ward off corn stalks, brush and the like when such articles come in contact with the guard plate 10.

I claim:

1. A valve guard consisting of a front guard plate, a table portion extending from said front plate intermediate of the top and bottom edges thereof and having a hole for the valve stem formed therein, a rear support portion depending from said table portion, and means for securing a tire valve in said hole with said front plate and said rear support portion resting on the rim of a wheel.

2. A one-piece tire valve guard stamped from a single piece of sheet material including a front wall portion having long base edges, a table portion integral with and extending from said front wall portion intermediate the upper and lower edges of said front wall portion, said table portion having a valve receiving hole formed therein, and the rear support portion depending from said table portion.

3. A valve stem guard formed from a single piece of sheet material including an arcuated guard plate having a base edge adapted to rest on the rim of a tractor wheel, an inner complemental plate extending virtually parallel with said guard plate having a surface resting on a wheel rim, an intermediate bridge portion connecting the top edge of said inner wall centrally of said guard plate holding said guard plate and said complemental plate spaced apart, said connecting bridge having a hole extending therethrough adapted to receive a valve stem of a pneumatic tire, said arcuated guard plate projecting above the tip of the valve stem to ward off objects tending to strike the valve stem.

4. A guard for a pneumatic tire valve stem for tractor wheels and the like having inner and outer parallelly extending guard support members, a bridge portion connecting said members, said outer guard member extending upwardly of said bridge portion, a valve stem receiving hole in said bridge member, a locking nut adapted to engage the valve stem and said bridge to lock said guard to the valve stem securely engaging with the wheel rim, said guard member adapted to ward off objects from striking the valve stem.

5. A valve stem guard formed from a single piece of material including wall portions adapted to rest against a wheel rim adjacent the base of the valve stem, an intermediate portion through which the valve stem extends spaced above the lower edges of said wall portions, one of said wall portions extending upwardly of said intermediate portion, and a locking nut holding said guard to the valve stem.

LEON J. BENOIT.

REFERENCES CITED

The following references are of record in the file of this patent:

UNITED STATES PATENTS

| Number | Name | Date |
| --- | --- | --- |
| 1,689,649 | Wagenhorst | Oct. 30, 1928 |

FOREIGN PATENTS

| Number | Country | Date |
| --- | --- | --- |
| 412,844 | Germany | May 2, 1925 |